United States Patent
Groendahl et al.

(10) Patent No.: US 11,431,217 B2
(45) Date of Patent: Aug. 30, 2022

(54) COIL LAYOUT FOR A GENERATOR HAVING TAPE CONDUCTORS

(71) Applicant: Siemens Gamesa Renewable Energy A/S, Brande (DK)

(72) Inventors: Erik Groendahl, Them (DK); Peter Hessellund Soerensen, Brædstrup (DK); Arwyn Thomas, Cheshire (GB)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/270,477

(22) PCT Filed: Jul. 26, 2019

(86) PCT No.: PCT/EP2019/070246
§ 371 (c)(1),
(2) Date: Feb. 23, 2021

(87) PCT Pub. No.: WO2020/043405
PCT Pub. Date: Mar. 5, 2020

(65) Prior Publication Data
US 2021/0328475 A1    Oct. 21, 2021

(30) Foreign Application Priority Data
Aug. 29, 2018    (EP) .................................... 18191524

(51) Int. Cl.
*H02K 3/28*    (2006.01)
*F03D 9/25*    (2016.01)
(Continued)

(52) U.S. Cl.
CPC ................. *H02K 3/28* (2013.01); *F03D 9/25* (2016.05); *H02K 7/1838* (2013.01); *H02K 55/02* (2013.01); *F05B 2220/706* (2013.01)

(58) Field of Classification Search
CPC ........ H02K 3/28; H02K 7/1838; H02K 55/02; F03D 9/25; F05B 2220/706
(Continued)

(56) References Cited

U.S. PATENT DOCUMENTS 5,391,926 A * 2/1995 Staley .................... F03D 3/061
290/55
2010/0066195 A1* 3/2010 Stiesdal .................. H02K 3/12
310/198

(Continued)

FOREIGN PATENT DOCUMENTS

CN    101340134 B    1/2011
EP    2 838 181 A1    2/2015
(Continued)

OTHER PUBLICATIONS

International Search Report and the Written Opinion of the International Searching Authority dated Nov. 23, 2019 for application No. PCT/EP2019/070247.
(Continued)

*Primary Examiner* — Charles Reid, Jr.
(74) *Attorney, Agent, or Firm* — Schmeiser, Olsen & Watts LLP

(57) ABSTRACT

Provided is an electric generator having a stator, a rotor, a plurality of coils including conductors shaped as a tape, the stator extending axially along a longitudinal axis between a first axial end and a second axial end, the stator including a plurality of slots, the plurality of slots being circumferentially distributed around a longitudinal axis of the stator, each of the coils respectively comprising: two slot portions respectively housed in two slots of the stator, two end-windings axially protruding from stator at the first axial end and a second axial end.

7 Claims, 3 Drawing Sheets

(51) Int. Cl.
*H02K 7/18* (2006.01)
*H02K 55/02* (2006.01)

(58) Field of Classification Search
USPC .................................................. 290/44, 55
See application file for complete search history.

(56) References Cited

U.S. PATENT DOCUMENTS

| | | | | |
|---|---|---|---|---|
| 2010/0066196 | A1* | 3/2010 | Stiesdal | H02K 3/12 |
| | | | | 310/198 |
| 2010/0253161 | A1* | 10/2010 | Kuroyanagi | H02K 3/12 |
| | | | | 310/44 |
| 2010/0277136 | A1* | 11/2010 | Snitchler | H02K 1/165 |
| | | | | 322/59 |
| 2012/0228982 | A1* | 9/2012 | Kimiabeigi | H02K 3/18 |
| | | | | 310/195 |
| 2016/0261159 | A1* | 9/2016 | Tsuiki | H02K 3/28 |

FOREIGN PATENT DOCUMENTS

| | | | | |
|---|---|---|---|---|
| JP | 2005176582 | A | 6/2005 | |
| JP | 4914362 | B2 | 4/2012 | |
| JP | 2014217168 | A | 11/2014 | |
| WO | 2017/024409 | A1 | 2/2017 | |
| WO | WO-2017024409 | A1 * | 2/2017 | H02K 9/19 |

OTHER PUBLICATIONS

International Search Report and Written Opinion dated Nov. 21, 2019 for PCT/EP2019/070246.

* cited by examiner

COIL LAYOUT FOR A GENERATOR HAVING TAPE CONDUCTORS

CROSS-REFERENCE TO RELATED APPLICATIONS

This application claims priority to PCT Application No. PCT/EP2019/070246, having a filing date of Jul. 26, 2019, which is based on EP Application No. 18191524.0, having a filing date of Aug. 29, 2018, the entire contents both of which are hereby incorporated by reference.

FIELD OF TECHNOLOGY

The following relates to a coil layout for an electric generator having tape conductors, in particular a high-temperature superconducting (HTS) generator. The following further relates to a method of providing a coil layout in an electric generator having tape conductors, in particular in a high-temperature superconducting (HTS) generator. Particularly, but not exclusively, the following may be applied to a HTS generator in a wind turbine.

BACKGROUND

In the above described technical field, it is known to use superconducting electric generators for wind turbines. The use of superconductors in wind turbines is attractive because it permits to reduce weight or to generate a larger amount of power. High-temperature superconducting (HTS) generators may be conveniently used in wind turbine applications, as they are characterized by a higher critical temperature for superconductivity (77K or lower).

In electrical generators a coil layout having overlapping coils at the end-windings may be required. Contact interferences between the coil conductors at the end-windings have to be avoided.

In normal conducting electric generators this can be achieved easily by bending the coil conductors, which have a circular section, at the end-windings. In superconducting electric generators the bending is however made problematic by the section shape of typical superconducting conductors (in particular superconducting conductors used in HTS applications), which are typically shaped as a tape, i.e. with a flat rectangular section. This may produce a bending stress within the superconducting conductor, which could damage or even break the coil.

There may be therefore still a need for providing a superconducting electric generator including a coil layout, which allows overlapping of the coils at the end-windings without generating a dangerous level of bending stress.

A further need is that of allowing the above described overlapping, at the same time avoiding complex coil geometries.

SUMMARY

According to a first aspect of embodiments of the invention there is provided an electric generator. The electric generator has a stator, a rotor and a plurality of superconducting coils, the stator extending axially along a longitudinal axis between a first axial end and a second axial end, the stator including a plurality of slots, the plurality of slots being circumferentially distributed around a longitudinal axis of the stator, each of the superconducting coils respectively comprising:

two slot portions respectively housed in two slots of the stator, two end-windings axially protruding from stator at the first axial end and a second axial end, wherein the slot portions are shaped and positioned in the respective slots so that the end-windings of two circumferentially adjacent coils overlap and are distanced in a radial direction orthogonal to the longitudinal axis.

Advantageously, the arrangement of the coil in two adjacent slots provides radial clearance for the end-windings while avoiding complex coil geometries.

Embodiments of the present invention may be applied to both integral-slot and fractional-slot electric generators.

Embodiments of the invention can be efficiently adapted to a superconducting electric generator of a wind turbine.

According to a second aspect of embodiments of the invention there is provided a method of providing a coil layout in an electric generator. The electric generator has a stator and a rotor, the stator extending axially along a longitudinal axis between a first axial end and a second axial end, the stator including a plurality of slots, the plurality of slots being circumferentially distributed around a longitudinal axis of the stator, the coil layout including a plurality of superconducting coils each respectively comprising:

two slot portions respectively housed in two slots of the stator, two end-windings axially protruding from stator at the first axial end and a second axial end.

According to the method the slot portions are inserted in the respective slots so that the end-windings of two circumferentially adjacent coils overlap and are distanced in a radial direction orthogonal to the longitudinal axis.

According to embodiments of the invention a slot portion of a first superconducting coil is housed in a respective first slot and a slot portion of a second superconducting coil is housed in a respective second slot circumferentially adjacent to the first slot.

According to a possible embodiment of the present invention, the slot portions of the first and the second superconducting coils have respective different curvatures in a longitudinal section including the longitudinal axis.

According to another embodiment of the present invention, the slot portions of the first and the second superconducting coils are inclined with respect to each other in a longitudinal section including the longitudinal axis.

According to a further embodiment of the present invention, the slot portions of the first and the second superconducting coils are parallel and radially distanced in a longitudinal section including the longitudinal axis.

All the above described embodiments apply to both the apparatus and the method of the present invention.

BRIEF DESCRIPTION

Some of the embodiments will be described in detail, with references to the following Figures, wherein like designations denote like members, wherein.

DETAILED DESCRIPTION

Figure 1:
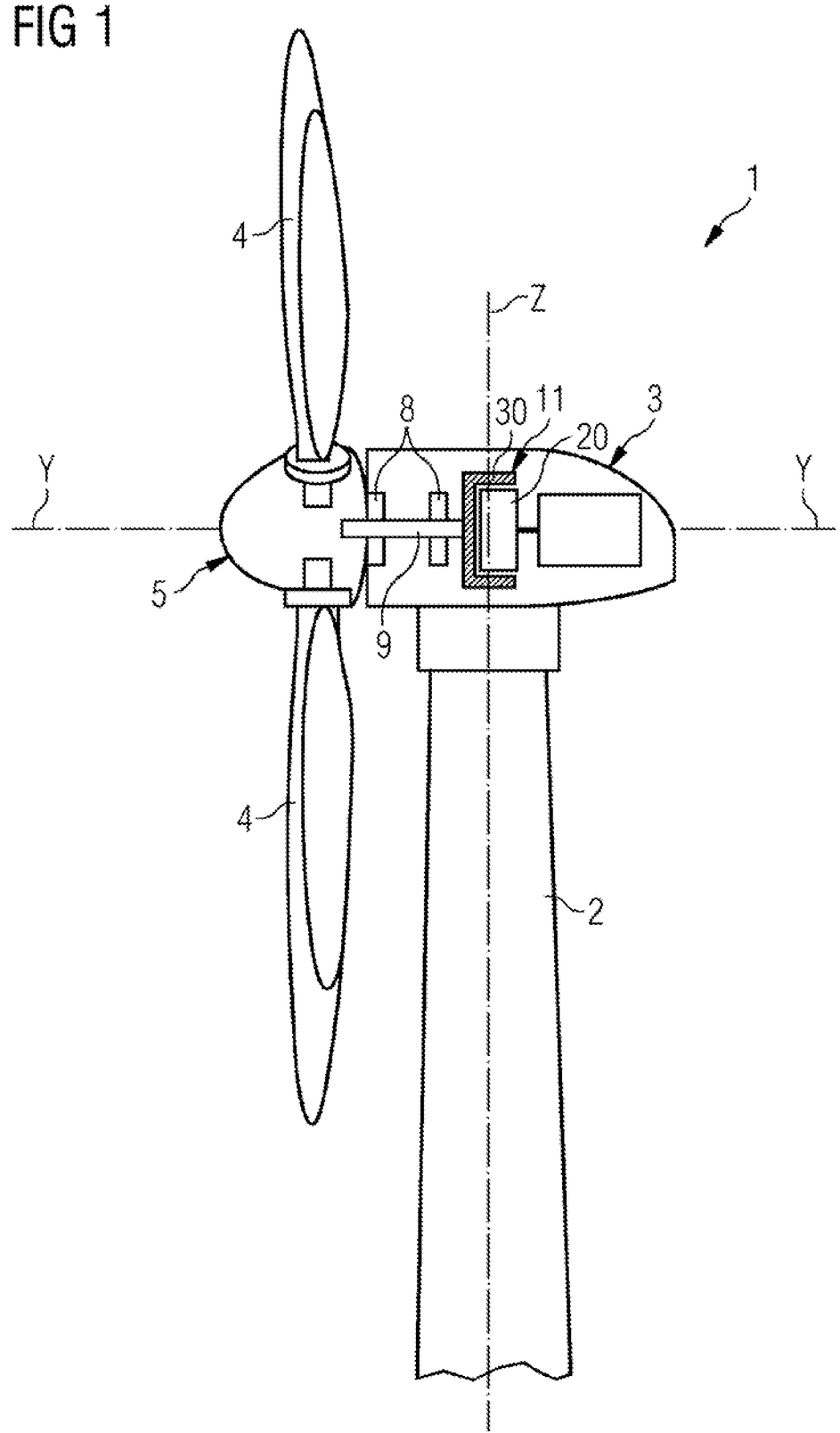
FIG. 1 shows a schematic section of a wind turbine including an electric generator and a cooling system according to embodiments of the present invention.

FIG. 1 shows a wind turbine 1 according to embodiments of the invention. The wind turbine 1 comprises a tower 2, which is mounted on a non-depicted fundament. A nacelle 3 is arranged on top of the tower 2.

The wind turbine 1 further comprises a wind rotor 5 having two, three or more blades 4 (in the perspective of FIG. 1 only two blades 4 are visible). The wind rotor 5 is rotatable around a rotational longitudinal axis Y. When not differently specified, the terms axial, radial and circumferential in the following are made with reference to the rotational axis Y.

The blades 4 extend radially with respect to the rotational axis Y.

The wind turbine 1 comprises a permanent magnet electric generator 11.

According to other possible embodiments of the present invention (not represented in the attached figures), embodiments of the present invention may be applied to any other type of permanent magnet machine with either internal or external rotor.

The wind rotor 5 is rotationally coupled with the permanent magnet generator 11 either directly, e.g. direct drive or by a rotatable main shaft 9 and through a gear box (not shown in FIG. 1). A schematically depicted bearing assembly 8 is provided in order to hold in place the main shaft 9 and the rotor 5. The rotatable main shaft 9 extends along the rotational axis Y.

The permanent magnet electric generator 11 includes a stator 20 and a rotor 30. The rotor 30 is rotatable with respect to the stator 20 about the rotational axis Y.

Figure 2:
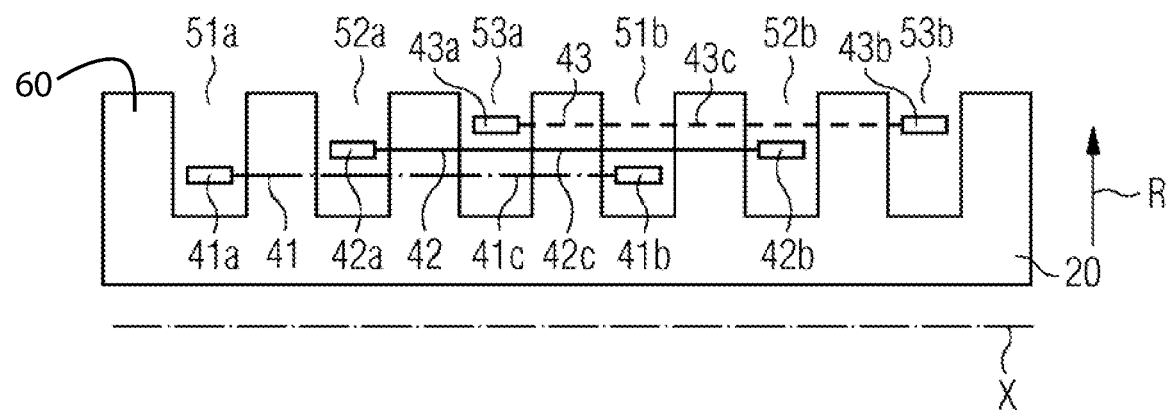
FIG. 2 shows a schematic partial cross section view of the stator of the electric generator of FIG. 1, taken according to the section line II-II of FIGS. 3, 4 and 5.

FIG. 2 schematically shows a partial and schematic sectional view of the rotor 20, orthogonal to the longitudinal axis Y.

The stator 20 extending axially along the longitudinal axis Y between a first axial end 22 and a second axial end 23 and includes a plurality of slots (six slots 51a, 52a, 53a, 51b, 52b, 53b in the non-limiting embodiment of FIG. 2) circumferentially distributed around the longitudinal axis Y and alternating with a plurality of teeth 60 along circumferential direction X, orthogonal to the longitudinal axis Y. Along the circumferential direction X, the six slots 51a, 52a, 53a, 51b, 52b, 53b are ordered in series as a first slot 51a, a second slot 52a, a third slot 53a, a fourth slot 51b, a fifth slot 52b and a sixth slot 53b.

A plurality of superconducting coils (three coils 41, 42, 43 in the non-limiting embodiment of FIG. 2) is arranged in the slots 51a, 52a, 53a, 51b, 52b, 53b.

The superconducting coils comprise superconducting conductors shaped as a tape, i.e. having a flat rectangular section where one dimension is significantly greater than the other.

According to the different embodiments of the present invention, the greater dimension of the conductor section may be oriented parallel or orthogonal to the circumferential direction X.

A first superconducting coil 41 comprises:
two slot portions 41a, 41b respectively housed in two respective slots (the first slot 51a and the fourth slot 51b in the non-limiting embodiment of FIG. 2),
two end-windings 41c axially protruding from stator 20 at the first axial end 22 and a second axial end 23.

A second superconducting coil 42 comprises:
two slot portions 42a, 42b respectively housed in two respective slots (the second slot 52a and the fifth slot 52b in the non-limiting embodiment of FIG. 2),
two end-windings 42c axially protruding from stator 20 at the first axial end 22 and a second axial end 23.

A third superconducting coil 43 comprises:
two slot portions 43a, 43b respectively housed in two respective slots (the third slot 53a and the sixth slot 53b in the non-limiting embodiment of FIG. 2),
two end-windings 43c axially protruding from stator 20 at the first axial end 22 and a second axial end 23.

The above described winding layout of the superconducting coils 41, 42, 43 may be repeated along the circumferential axis X beyond the first slot 51a and the sixth slot 53b.

The above described winding layout determines an overlapping of the end-windings 41c, 42c, 43c.

According to different embodiment of the present invention (not shown) a different number of superconducting coils may be provided. According to different embodiment of the present invention (not shown) the superconducting coils are housed in the stator 20 according to any other winding layout which causes an overlapping of the end-windings.

To avoid interference between the end-windings 41c, 42c, 43c the slot portions 41a, 41b, 42a, 42b, 43a, 43b are shaped and positioned in the respective slots 51a, 51b, 52a, 52b, 53a, 53b so that the end-windings 41c, 42c, 43c of two circumferentially adjacent coils 41, 42, 43 overlap and are distanced in a radial direction R orthogonal to the longitudinal axis Y and to the circumferential direction X.

Figure 3:
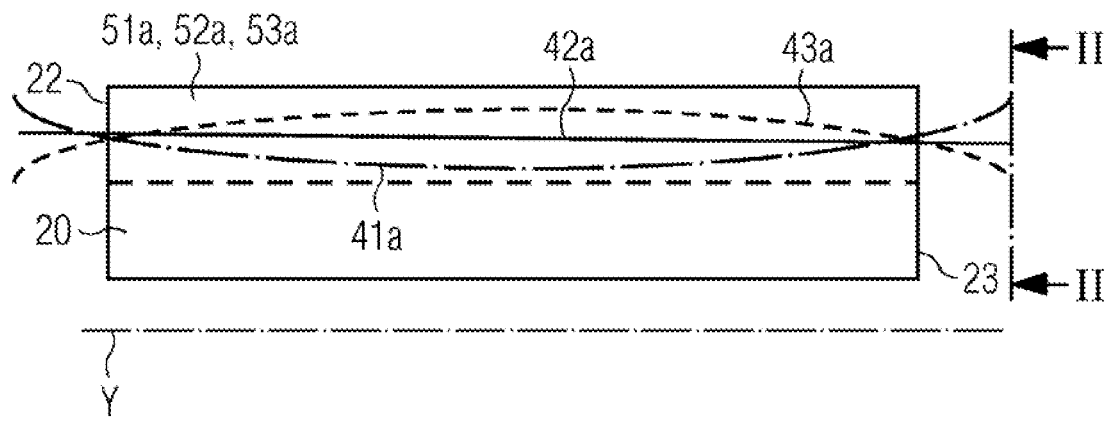
FIG. 3 shows a schematic longitudinal section view of the stator of a first embodiment of the electric generator of FIGS. 1 and 2.
Figure 4:
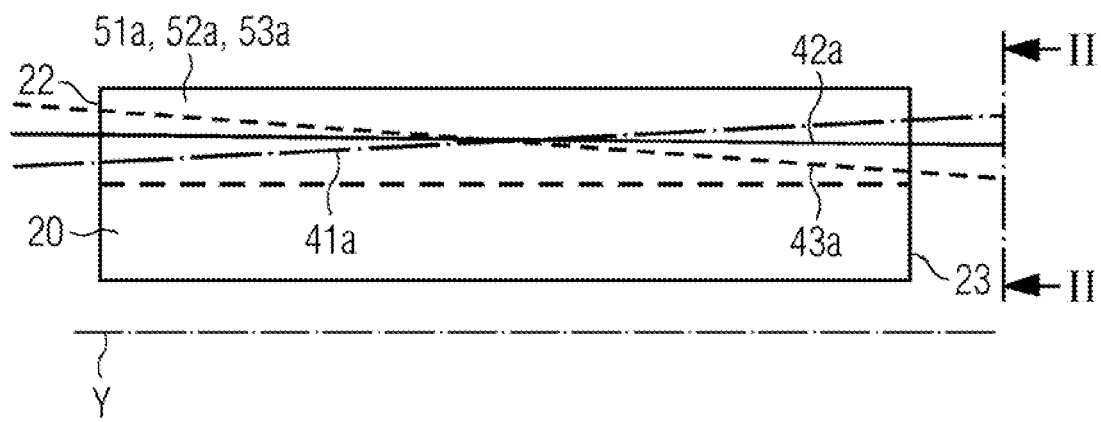
FIG. 4 shows a schematic longitudinal section view of the stator of a second embodiment of the electric generator of FIGS. 1 and 2.
Figure 5:
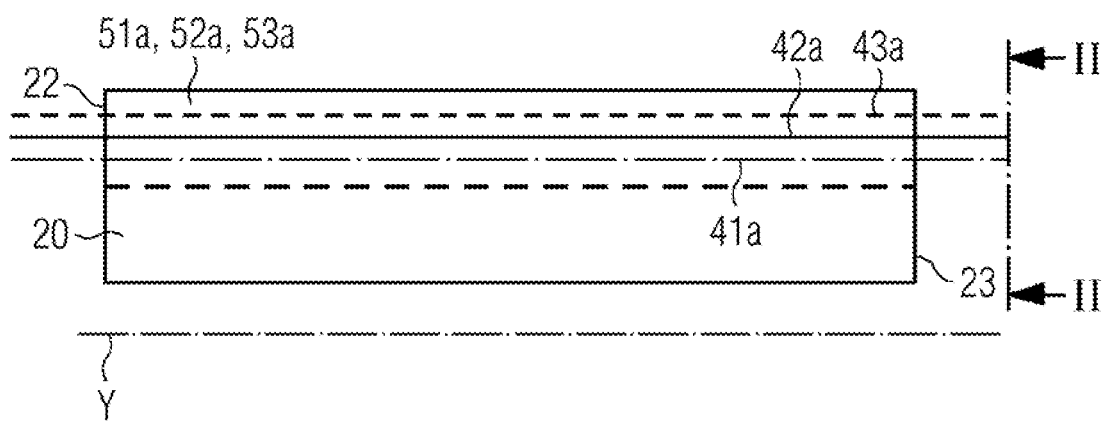
FIG. 5 shows a schematic longitudinal section view of the stator of a third embodiment of the electric generator of FIGS. 1 and 2.

Three different embodiments are respectively shown in FIGS. 3, 4 and 5, where the slot portions 41a, 42a, 43a of the superconducting coil 41, 42 43 and the first, second and third slots 51a, 52a, 53a are shown superposed to one another in a longitudinal section including the longitudinal axis Y.

In the first embodiment of FIG. 3, the slot portions 41a, 42a, 43a have respective different curvatures. Particularly, the slot portion 41a of the first superconductive coil 41 is curved with a convex shape pointing towards the longitudinal axis Y, the slot portion 42a of the second superconductive coil 42 is straight and the slot portion 43a of the third superconductive coil 43 is curved with a convex shape pointing away from the longitudinal axis Y.

In the second embodiment of FIG. 4, the slot portions 41a, 42a, 43a are inclined with respect to each other. Particularly, the slot portion 41a of the first superconductive coil 41 is inclined towards the first axial end 22, the slot portion 42a of the second superconductive coil 42 is straight and the slot portion 43a of the third superconductive coil 43 is inclined towards the second axial end 23.

In the third embodiment of FIG. 5, the slot portions 41a, 42a, 43a are parallel and radially distanced with respect to each other. Particularly, the slot portion 41a of the first superconductive coil 41 is closer to the longitudinal axis Y, the slot portion 42a of the second superconductive coil 42 is intermediate and the slot portion 43a of the third superconductive coil 43 is more remote from the longitudinal axis Y.

Other embodiments (not shown) may be provided according to the present invention, provided that it is assured that, at the first axial end 22 and the second axial end 23 or at a longitudinal distance from the first axial end 22 and the second axial end 23, the end-windings are distanced along the radial direction R.

Embodiments of the present invention apply also more in general to non-superconducting coils comprising non-superconducting conductors shaped as a tape.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An electric generator comprising a stator, a rotor and a plurality of coils including conductors shaped as a tape, the stator extending axially along a longitudinal axis between a first axial end and a second axial end, the stator including a plurality of slots, the plurality of slots being circumferentially distributed around a longitudinal axis of the stator, each of the plurality of coils respectively comprising:
   two slot portions respectively housed in two slots of the stator;
   two end-windings axially protruding from the stator at the first axial end and the second axial end;
   wherein the slot portions are shaped and positioned in the respective slots so that the end-windings of two circumferentially adjacent coils of the plurality of coils overlap and are distanced in a radial direction orthogonal to the longitudinal axis, and
   wherein a slot portion of a first coil is housed in a respective first slot and a slot portion of a second coil is housed in a respective second slot circumferentially adjacent to the first slot, the slot portions of the first and the second coils having respective different curvatures or being inclined with respect to each other in a longitudinal section including the longitudinal axis.

2. The electric generator of claim 1, wherein the plurality of coils are superconducting coils.

3. The electric generator of claim 1, wherein the electric generator is an integral-slot electric generator.

4. The electric generator of claim 1, wherein the electric generator is a fractional-slot electric generator.

5. A wind turbine including an electric generator according to claim 1.

6. A method of providing a coil layout in an electric generator comprising a stator, a rotor, the stator extending axially along a longitudinal axis between a first axial end and a second axial end, the stator including a plurality of slots, the plurality of slots being circumferentially distributed around a longitudinal axis of the stator, the coil layout including a plurality of coils each respectively comprising:
   two slot portions respectively housed in two slots of the stator;
   two end-windings axially protruding from the stator at the first axial end and the second axial end;
   wherein the slot portions are inserted in the respective slots so that the end-windings of two circumferentially adjacent coils overlap and are distanced in a radial direction orthogonal to the longitudinal axis,
   inserting a slot portion of a first coil in a respective first slot; and
   inserting a slot portion of a second coil in a respective second slot circumferentially adjacent to the first slot;
   wherein the slot portions are bent according to respective different curvatures or are inclined with respect to each other in a longitudinal section including the longitudinal axis.

7. The method of claim 6, wherein the plurality of coils are superconducting coils.

* * * * *